(12) United States Patent
Chuang

(10) Patent No.: US 6,513,557 B1
(45) Date of Patent: Feb. 4, 2003

(54) DEVICE FOR QUICKLY ELEVATING AND MICRO-ADJUSTING THE WORKBENCH OF A PLANING MACHINE

(76) Inventor: Bor Yann Chuang, No. 78, Yungfeng Rd., Taiping Shiang, Taichung (TW), 411

( * ) Notice: Subject to any disclaimer, the term of this patent is extended or adjusted under 35 U.S.C. 154(b) by 0 days.

(21) Appl. No.: 09/981,867

(22) Filed: Oct. 19, 2001

(51) Int. Cl.[7] .................................................. B27C 1/00
(52) U.S. Cl. .................. 144/129; 144/114.1; 144/286.5
(58) Field of Search ................................ 108/2, 6, 145, 108/146, 71; 144/114.1, 117.1, 129, 130, 286.5

(56) References Cited

U.S. PATENT DOCUMENTS

| | | | | |
|---|---|---|---|---|
| 2,601,879 A | * | 7/1952 | VanDam | 144/129 |
| 2,804,107 A | * | 8/1957 | Taylor | 144/129 |
| 2,960,125 A | * | 11/1960 | Erickson et al. | 144/129 |
| 5,533,557 A | * | 7/1996 | Jedlicka et al. | 144/129 |
| 5,979,521 A | * | 11/1999 | Garcia | 144/129 |

* cited by examiner

*Primary Examiner*—W. Donald Bray
(74) *Attorney, Agent, or Firm*—Troxell Law Office PLLC

(57) ABSTRACT

A device for quick elevating and micro-adjusting a planing workbench includes a movable workbench pivotally assembled on a bottom base, an adjusting device pivotally connected with the bottom base by a connecting rod, an adjusting base provided with an elevating rod and a support shaft pivotally connected to a preset position of the movable workbench. When the elevating rod is activated to move up or down, the movable workbench will ascend or descend quickly by an interaction of the connecting rod. In case the elevating rod is rotated to activate the support shaft to turn around, the movable workbench is micro-adjusted to move up or down slightly. Then, a locking grip is provided at one end of the elevating rod for tightly locking the elevating rod, rendering it unmovable up or down any longer but merely capable to micro-adjust the movable workbench to ascend or descend slightly.

7 Claims, 5 Drawing Sheets

US 6,513,557 B1

DEVICE FOR QUICKLY ELEVATING AND MICRO-ADJUSTING THE WORKBENCH OF A PLANING MACHINE

BACKGROUND OF THE INVENTION

This invention relates to a device for quick elevating and micro-adjusting a planing workbench, particularly to one possible to have a planing workbench locked and moved up or down safely and conveniently.

The elevating device of a conventional planing machine, as shown in FIG. 1, includes a slanting base provided at one side of the planing machine and a slanting surface assembled on the slanting base. In handling, a threaded rod is rotated by a hand-wheel to let the workbench move up and down on the slanting base of the planning machine. However, according to such a conventional device, the threaded rod is limited to move up or down by its threads without a function of micro-adjusting.

SUMMARY OF THE INVENTION

The main objective of this invention is to offer a device for quickly elevating and micro-adjusting a planing workbench, having a guide plate and a locking grip provided at one side of an adjusting device for controlling the workbench to move up or down quickly just by unscrewing the locking grip, ensuring safety in handling.

Another objective of this invention is to offer a device for quick elevating and micro-adjusting a planing workbench, in which the movable workbench is restricted and guided to move up or down by a crescent-shaped sliding groove of a guide plate, possible to adjust and control the movable workbench smoothly.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
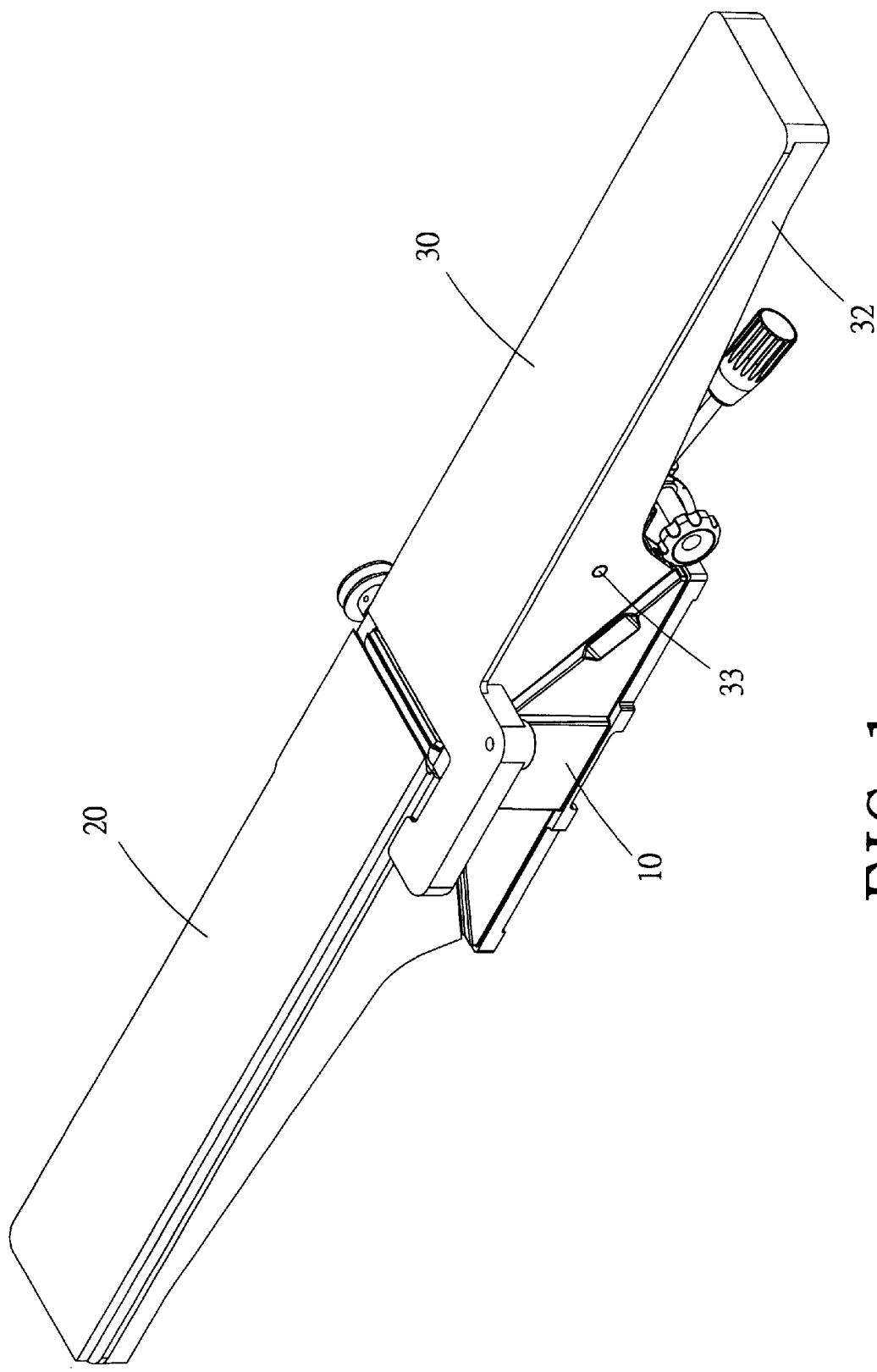
FIG. 1 is a perspective view of a device of quick elevating an adjusting a planing workbench in the present invention.
Figure 2:
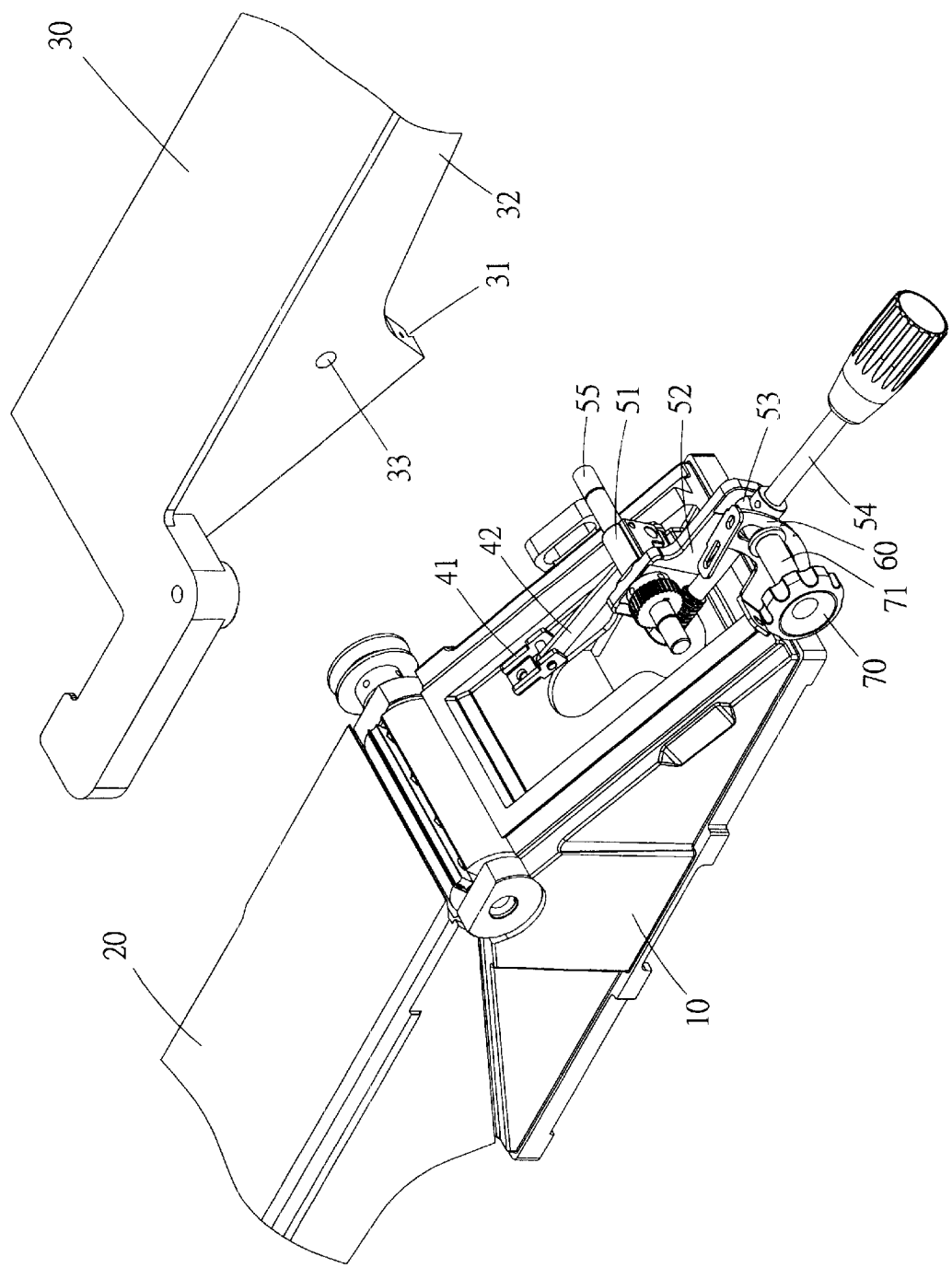
FIG. 2 is an exploded perspective view of a movable workbench in the present invention.
Figure 3:
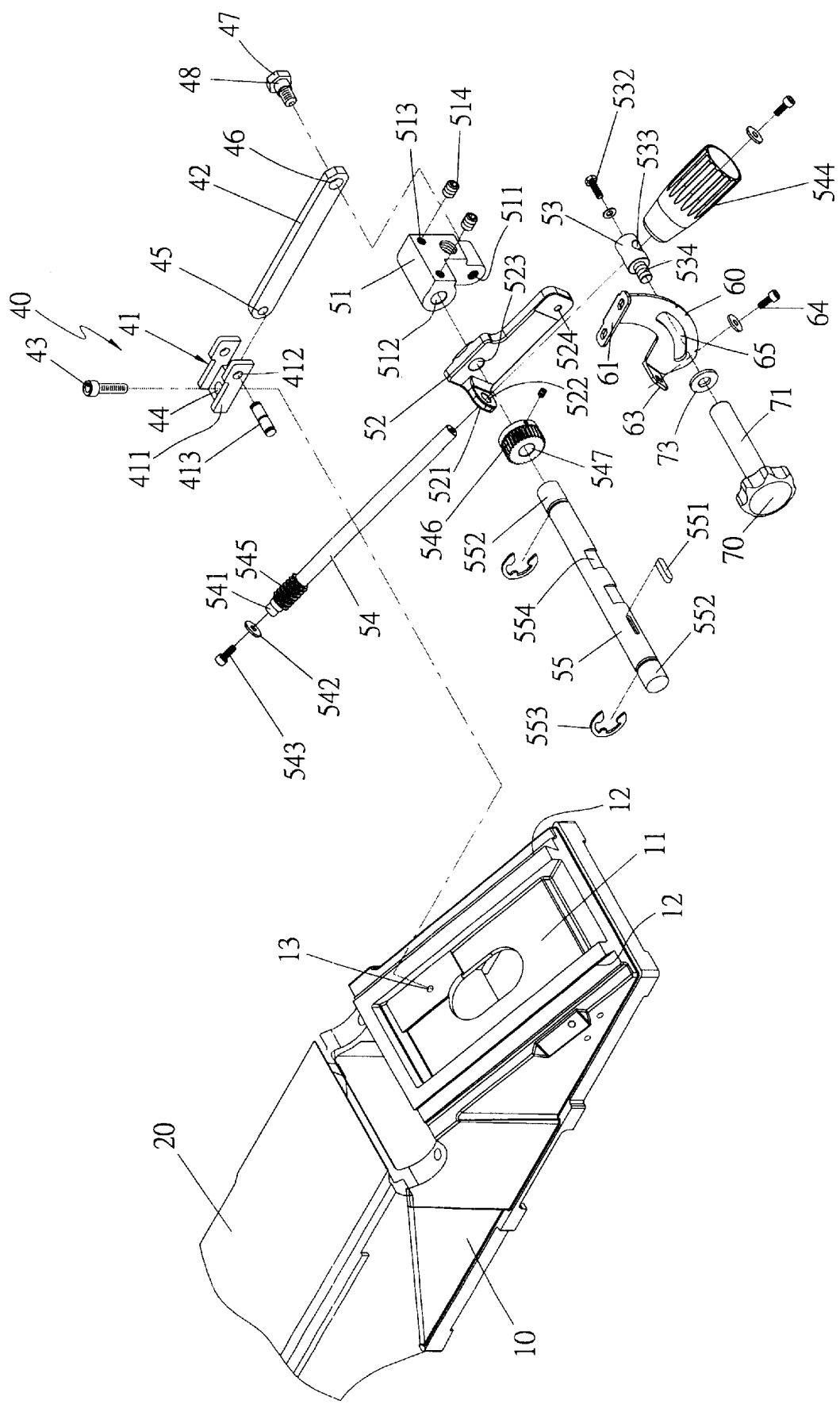
FIG. 3 is an exploded perspective view of the device of quickly elevating and micro adjusting a planing workbench in the present invention.

A device for quickly elevating and micro-adjusting a planing workbench in the present invention, as shown in FIGS. 1, 2 and 3, includes a bottom base 10, a stationary workbench 20, a movable workbench 30, a rod connecting device 40, an adjusting device 50 and a fixing device 60 as main components combined together.

The bottom base 10 has a right-sloped side 11, and a pigeon-tail-shaped sliding plate 12 formed respectively on a front and a rear end of the right-sloped side 11 and a screw hole 13 bored in a preset position in the right-sloped side 11.

The stationary workbench 20 is stably fixed on the left side of the bottom base 10.

The movable workbench 30 is assembled on the right sloped side 11 of the bottom base 10, as shown in FIG. 2, having a side plate 32 provided on a front and a rear side respectively. Each side plate 32 has a pigeon tail-shaped groove 31 of a preset sloped angle in a bottom side to engage the pigeon tail-shaped sliding plate 12 of the bottom base 10 and move to each other. Further, the side plates 32 respectively have a fixing hole 33 provided oppositely at a predetermined position.

The rod-connecting device 40 has a fixing base 41, secured on a front portion of the right-sloped side 11 of the bottom base 10 by means of a screw 43 inserting through a fixing hole 44 on the front end of the fixing base 41 and screwed fixedly in the screw hole 13 of the bottom base 10. Besides, the fixing base 41 has two side plates 411 provided at two opposite sides, with each side plate 411 having a pivotal hole 412 in an opposite position. Then, a connecting rod 42 is pivotally fitted between two side plates 411 with a pin 413 inserting through two pivotal holes 412 and the pivotal hole 45 at a front end of the connecting rod 42, further having another pivotal hole 46 bored at a rear end.

The adjusting device 50 consists of an adjusting base 51, an elevating base 52, a fixing block 53, an elevating rod 54 and a support shaft 55.

The adjusting base 51 has a screw hole 511 in a lower end for receiving a bolt 47 after it is inserted through the pivotal hole 46 of the connecting rod 42. Further, the contacting portion between the bolt 47 and the connecting rod 42 is shaped with a column 48 so as to enable the connecting rod 42 and the adjusting base 51 to rotate each other. In addition, the adjusting base 51 has a horizontal through shaft hole 512 on an upper portion and two screw holes 513 aligned spaced apart on a front side and communicating with the shaft hole 512.

The elevating base 52 is shaped as a plate provided at the front end of the adjusting base 51, having a projecting strip 521 with a round hole 522 formed vertically on a front side, and a shaft hole 523 on an upper portion to correspond to the shaft hole 512 of the adjusting base 51 and further a fixing hole 524 in the center of a rear end.

Figure 4:
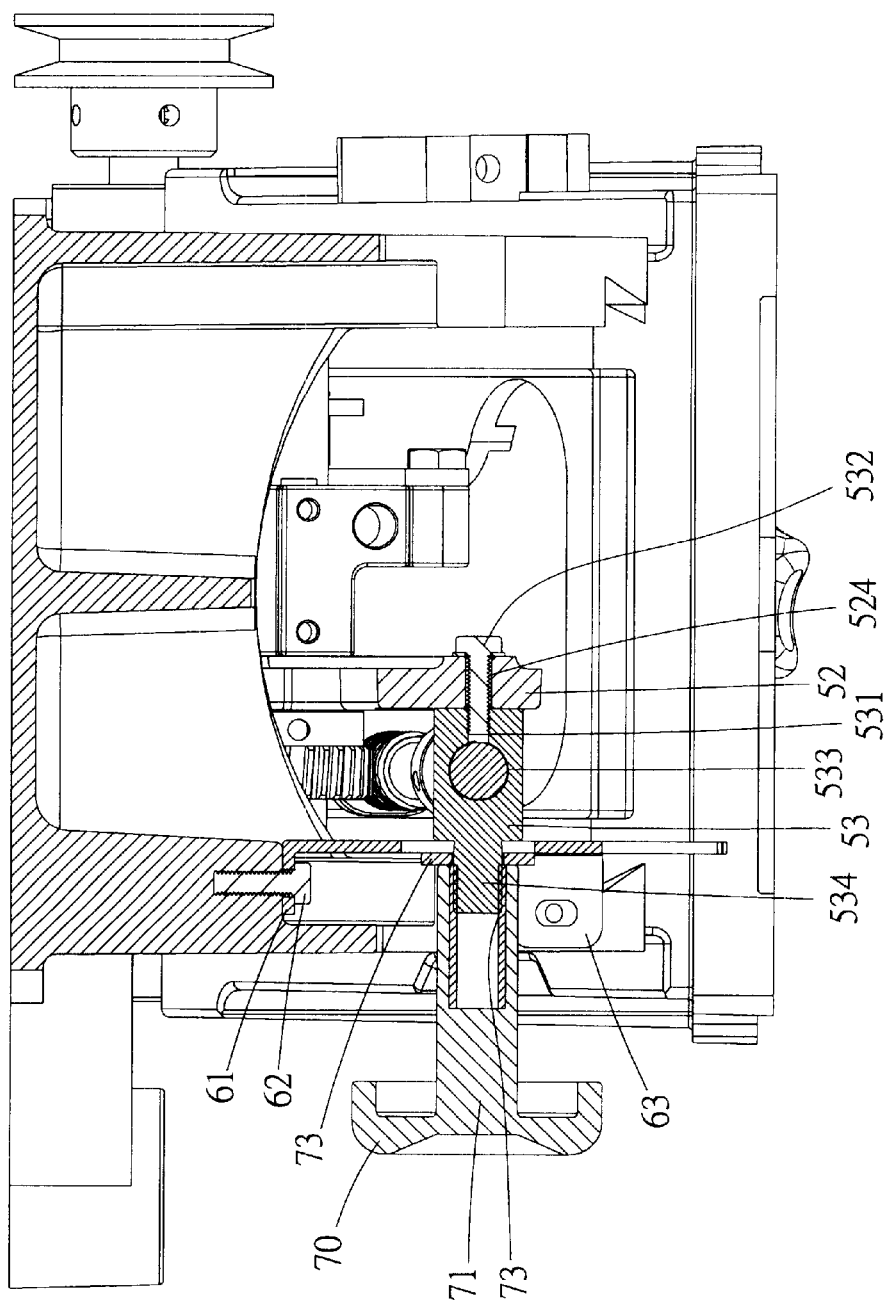
FIG. 4 is a cross-sectional view of a locking grip and the related components in the present invention.

The fixing block 53 is column-shaped, as shown in FIG. 4, having a screw hole 531 in the rear end center firmly screwed together with the fixing hole 524 of the elevating base 52 by means of a bolt 532. The fixing block 53 is bored with a round hole 533 in an intermediate portion to match with the round hole 522 of the elevating base 52 and has a column-like sliding rod 534 protruding out from a front end and having male threads The elevating rod 54 is column-shaped and has a fit member 541 formed on top with a smaller diameter than that of the rod body 54. After the fit member 541 is inserted through the round hole 522 of the elevating base 52, it is secured with a washer 542 and a screw 543 so that the elevating rod 54 is limited in its position but capable to be rotated. Then, the bottom end of the elevating rod 54 is inserted through the round hole 533 of the fixing block 53 and is firmly fixed with a grip 544. Besides, the elevating rod 54 is provided with a worm 545 on an upper portion under the projecting strip 521 to engage a worm wheel 546 positioned beside the worm 545, with the worm wheel 546 having a shaft hole 547 in the center.

The support shaft 55 is inserted through the central shaft hole 547 of the worm wheel 546 and fixed therein by means of a double round-headed key 551, and subsequently, the support shaft 55 passes through the shaft hole 523 of the elevating base 52 and the shaft hole 512 of the adjusting base 51, with both ends 522 respectively inserted in the fixing hole 33 of the side plate 32 of the movable workbench 30 and respectively fixed in place by a C-shaped lock washer 553. Additionally, two flat recesses 554 matching with two screw holes 513 of the adjusting base 51 are formed on an intermediate portion of the support shaft 55 for two screws 514 to tightly screw against thereon after screwing through the screw holes 513 so as to make the support shaft 55 and the adjusting base 51 connected together firmly.

The guide plate 60 is a C-shaped, having a horizontal top plate 61, as shown in FIG. 4, to be stably secured under the movable workbench 30 by two screws 62 and a side plate 63 on a front side fixed with a screw 64 on a side portion under the movable workbench 30. The guide plate 60 further has a crescent-shaped through sliding groove 65.

The locking grip 70, as shown in FIGS. 3 and 4, has a round rod 71, with its end portion formed with a female threaded hole 72. The sliding rod 534 of the fixing block 53 is screwed with the female threaded hole 72 of the locking grip 70, after inserted through the sliding groove 65 and fitted with a gasket 73.

Figure 5:
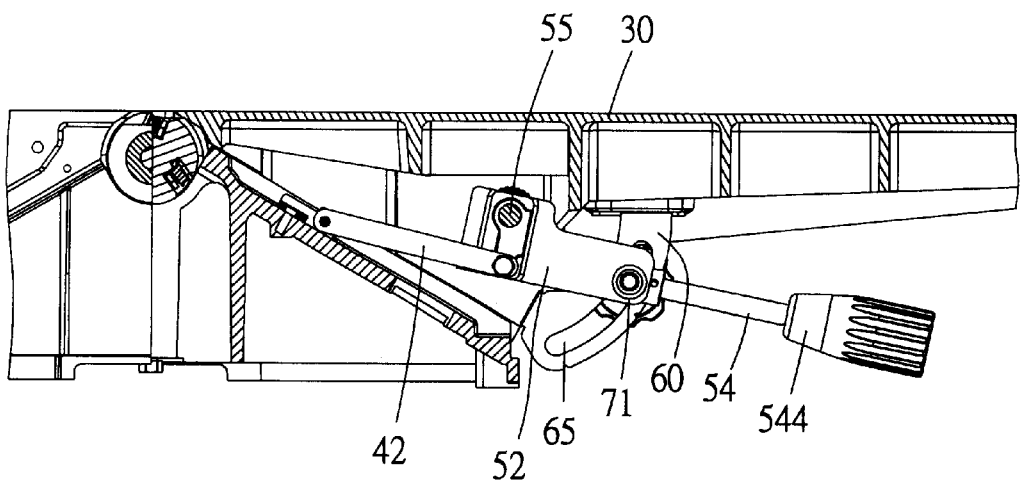
FIG. 5 is a cross-sectional view of the movable workbench in the original stationary position in the present invention.
Figure 6:
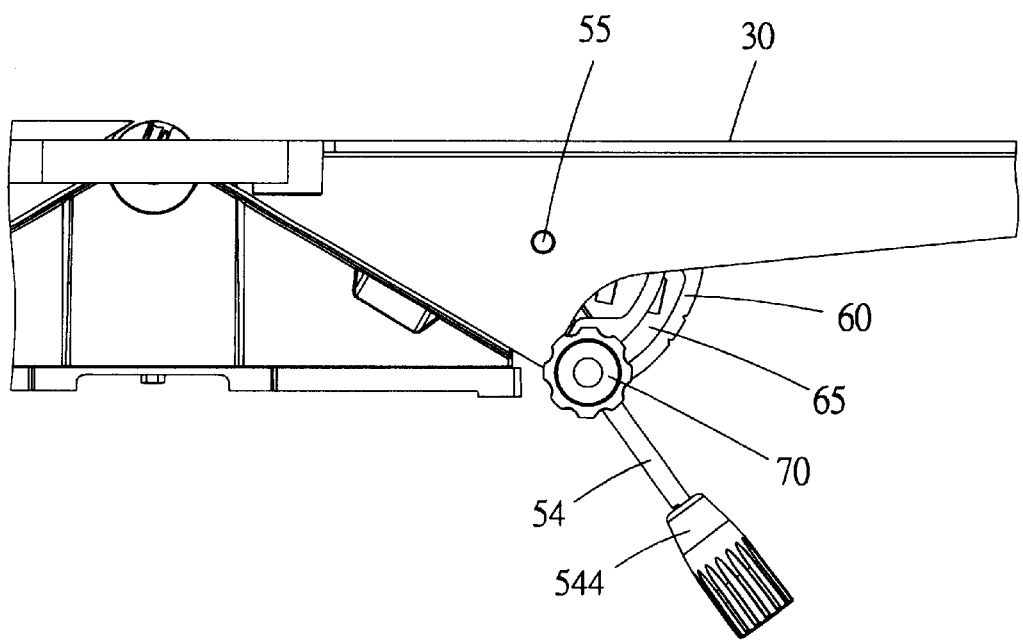
FIG. 6 is a cross-sectional view of the movable workbench in a descending condition in the present invention.

In handling, referring to FIG. 5, in case the height of the movable workbench is to be quickly adjusted, firstly unscrew loose the locking grip 70 to allow the sliding rod 534 of the fixing block 53 slide in the sliding groove 65 of the guide plate 60. Next, press down the grip 544 of the elevating rod 54, as shown in FIG. 6, guided by the sliding groove 65 of the guide plate 60 and indirectly transmitted by the connecting rod 42, letting the sliding plate 12 of the movable workbench 30 of the slope 11 of the bottom base 10 move down quickly, because the movable workbench 30 has the support shaft 55 pivotally connected together with the elevating base 52 as well as the adjusting base 51, the adjusting base 51 connected with the connecting rod 42 as well as the fixing base 41 and the fixing base 41 screwed stably with the bottom base 10 by means of a bolt 43 as a fixed fulcrum.

The movable workbench 30 is restricted to move up and down by the sliding groove 65 of the guide plate 60 and it can be adjusted and controlled smoothly because the through sliding groove 65 is a crescent-shaped, having function of smooth guiding.

When micro-adjusting the workbench is required, as shown in FIG. 2, firstly screw tightly the locking grip 70 and let the fixing block 53 fixed unmovable in the sliding groove 65. Next, slightly rotate the grip 544 to let the worm 545 of the elevating rod 54 rotating a bit together with the worm wheel 546 engaged and synchronously the support shaft 55 activated to rotate slightly with the adjusting base 51 because the support shaft 55 is connected with the adjusting base 51 by means of the two screws 514. Further, as the adjusting base 51 is pivotally connected with the connecting rod 42, the connecting rod 42, the adjusting base 51 and the support shaft 55 will slightly move up or down, and at the same time the support shaft 55 will activate the sliding plate 12 of the movable workbench 30, positioned on the slope 11 of the bottom base 10, to ascend or descend slightly. The range of micro-adjusting the movable workbench 30 in this embodiment is preferably set between 1.2 mm and 2 mm.

Evidently, the guide plate 60 in this invention is applied to allow the locking grip 70 to secure the fixing block 53 unmovable in order to prevent the movable workbench 30 from moving down automatically during operating. Besides, in case the movable workbench 30 is to be moved up or down with quickness, the locking grip 70 has to be unscrewed loose first, thus ensuring safety in handling.

Moreover, the fixing block 53 and the guide plate 60 in this invention are utilized to enable the locking grip 70 to connectively control and changeover the elevating rod 54 to move up or down quickly and adjust slightly. However, in practice, the quick elevating and micro adjusting of the workbench in this invention is still effected by controlling the grip 544 of the elevating rod 54, thus safe, accurate and convenient in handling.

While the preferred embodiment of the invention has been described above, it is recognized and understood that various modifications may be made therein and the appended claims are intended to cover all such modifications that may fall within the spirit and scope of the invention.

I claim:

1. A device for quickly elevating and micro-adjusting a planing workbench comprising:

a base having a right inclined surface and a left horizontal surface, the right inclined surface having an opening for insertion of a screw and a pigeon tail shaped sliding plate formed on a front and opposite back end of the right inclined surface;

a stationary workbench which is stably fixed to the left horizontal surface of the base;

a movable workbench pivotally mounted to the right inclined surface of the base, including front and rear side plates, each of the side plates having an opposite fixing hole;

a connecting rod with first and second opposite ends, the first end having a fixing base connected to the right inclined surface of the base by screws inserted into the opening on the right inclined surface; and an adjusting device pivotally connected to the second end of the connecting rod, comprising an adjusting base, a support shaft, elevating rod and a locking grip, the adjusting base has an elevating rod attached to a preset position, the support shaft is connected the one of the fixing holes on the movable workbench, the elevating rod interacts with the connecting rod and the locking grip connected to one end of the elevating rod for locking the elevating rod in position.

2. The device of claim 1, wherein the adjusting device has an elevating base with first and second opposite ends and top and opposite bottom sides, the adjusting device being pivotally mounted on the first end of the elevating base.

3. The device of claim 2, wherein the movable workbench has a guide plate having a through sliding groove, a fixing block assembled on the second end of the elevating base and having a round hole for the elevating rod to pass through and also having a sliding rod protruding out from a front end, the sliding rod of the fixing block first inserted through a sliding groove of a guide plate and then screwed with the locking grip.

4. The device of claim 3 wherein the sliding groove of the guide plate is crescent-shaped.

5. The device of claim 2, wherein a projecting plate with a round hole is vertically fixed on a head side of the elevating base, and the elevating rod has a fit member with a smaller diameter than that of the elevating rod body formed on top, the fit member of the elevating rod inserted through the round hole of the elevating base and screwed by a washer and a screw.

6. The device of claim 1, wherein a worm is provided on an upper portion of the elevating rod under the projecting plate of the elevating base engaging a worm wheel, the worm wheel fixed around the support rod.

7. The device of claim 1, wherein a shaft hole is bored on the adjusting base and receiving the support shaft, two screw holes are formed spaced apart on a rear side of the adjusting base communicating with the shaft hole, and two flat recesses corresponding to the two screw holes are formed on the support shaft for two screws to screw against thereon after inserted through the two screw holes.

* * * * *